United States Patent Office 3,565,916
Patented Feb. 23, 1971

3,565,916
PROPIOLACTONES AND DERIVATIVES THEREOF
Kentaro Okumura, Kobe-shi, Toshiyuki Fujii, Minoo-shi, Osaka-fu, Naoto Yoneda, Suita-shi, Osaka-fu, and Munetugu Miyoshi, Nishinomiya-shi, Japan, assignors to Tanabe Seiyaku Co., Ltd., Osaka, Japan, a corporation of Japan
No Drawing. Filed Apr. 17, 1968, Ser. No. 721,931
Claims priority, application Japan, Apr. 20, 1967, 42/25,293; Dec. 25, 1967, 42/83,085
Int. Cl. C07d 3/00
U.S. Cl. 260—343.9      1 Claim

ABSTRACT OF THE DISCLOSURE

Arenesulfonamido propiolactones and process for preparation thereof and use thereof in process for preparation of seryl peptide.

---

This invention relates to novel intermediates for preparing seryl peptide and a process for preparing seryl peptide using said intermediates.

It has been known that serine is abundant in various peptides and enzymes as an important component thereof. Although various attempts were made to synthesize peptides involving the serine moiety therein, satisfactory results have never been obtained heretofore. The instability of the peptide bond of serine per se, and the reactivity of the free hydroxy group of serine, which will induce side reactions such as β-elimination or acyl rearrangement (from N- to O-position), interferes with the normal reaction and lowers the yield and the purity of the desired peptide. Such tendency is more noticeable in the preparation of seryl peptides where serine exists on N-terminal of the peptide. For example, side reactions such as anhydride formation, β-lactone formation or azolactone formation occur when the conventional azile or carbo di imide method for the synthesis of peptides is attempted.

We have now found that α-arenesulfonamido-β-propiolactone represented by the following general formula:

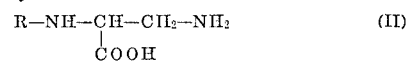

wherein R is a conventional protecting group of the arenesulfonyl type for the amino group such as benzenesulfonyl or p-toluenesulfonyl, are useful as intermediates for the synthesis of seryl peptides. These compounds are particularly useful in their optically active form in order to prepare the corresponding optically active seryl peptides. Examples of the above lactone compounds are α-benzenesulfonamido-β-propiolactone and α-(p-toluenesulfonamide)-β-propiolactone (hereinafter designated as α-tosylamido-β-propiolactone).

It is an object of the present invention to provide an improved method for the introduction of a seryl group into an ester of an amino acid or peptide at its N-terminal using these lactone compounds. Another object is to provide a convenient method for the introduction of an optically active seryl group into an ester of amino acid or peptide without racemization. A further object is to provide lactone compounds which are novel intermediates which are useful in preparing seryl peptides. Other objects will be apparent from the following detailed explanation.

According to an embodiment of the present invention, the lactone compounds (I) are prepared by reacting the corresponding α-N-substituted-α,β-diamino-propionic acid represented by the formula:

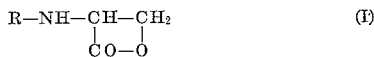

(wherein R has the same meaning as stated above), with nitrous acid. The nitrous acid is added into the reaction mixture in a conventional manner. For example, it may be introduced as a solution containing nitrous acid prepared by the reaction of a soluble salt of nitrous acid such as sodium nitrite with an acid. Conventional mineral acids or organic acids such as sulfuric acid, hydrochloric acid, phosphoric acid, metaphosphoric acid, formic acid, acetic acid, tartaric acid, citric acid, p-toluenesulfonic acid, etc. are preferably used for this purpose.

In a preferred embodiment, the reaction is carried out by dissolving the starting compound (II) in an aqueous solution of an acid, and adding a nitrite gradually to the solution. It is best to carry out the reaction at a temperature lower than about 5° C. After the reaction, the resultant lactone compounds (I) may be isolated from the reaction mixture as crystals. Although a small amount of N-substituted-serine resulting from a side reaction is sometimes found in the crystals, the contaminant can be readily removed by washing with a weakly alkaline solution such as an aqueous solution of sodium carbonate or sodium bicarbonate. If the starting compounds (II) are used in their optically active form, the corresponding optically active lactone compounds (I) are produced. The starting compounds (II) can be, for instance, prepared in high yields by Hofmann Rearrangement of the corresponding N-substituted derivatives of asparagine.

According to a further embodiment of the present invention, seryl peptides are prepared by reacting the lactone compound (I) with an ester of amino acid or peptide. The reaction may be carried out in a conventional manner. For example, the lactone compounds and an ester of amino acid or peptide are admixed in a suitable solvent, and the solution is allowed to stand at room or elevated temperature; preferably at 40°-50° C. for several hours, whereby a seryl peptide is obtained in high yield of 75%-80%. As the reaction solvent, ethyl acetate, tetrahydrofurane, dioxane or a mixture thereof are preferred. Other conventional organic solvents or even water can also be used for the same purpose. Esters of amino acids or peptides are used in the form of free base in the reaction. However, the acid addition salt thereof can be also used for the same purpose after neutralizing with bases such as triethylamine. If the lactone compounds (I) are used in their optically active form, the resulting peptides have the corresponding optical active seryl group on their N-terminal.

The seryl peptides thus prepared can be isolated from the reaction mixture by extracting the mixture with a non-aqueous organic solvent, and removing the solvent from the extract. It is convenient to employ ethyl acetate as the reaction solvent, because it is also utilized as the extraction solvent. The seryl peptides thus obtained may further be more purified by washing with an aqueous solution of sodium bicarbonate.

EXAMPLE 1

13.4 g. of L-α-tosylamido-β-amino-propionic acid was dissolved in a solution of 3.0 g. of tartaric acid in 200 ml. of water. To the solution was added dropwise a solution of 10.5 g. of sodium nitrite in 100 ml. of water under cooling at about 5° C. for 5 hours with stirring. The reaction mixture was stirred for additional one hour at the same temperature and the resulting crystals were collected by filtration. The crystals were washed with water and dissolved in ethyl acetate. The solution was washed with an aqueous solution of sodium bicarbonate and water successively. The solution was dried and evaporated to remove the solvent, whereby 6.7 g. of L-α-tosylamino-β-propiolactone was obtained as colorless fine needles. Yield: 56%. M.P. 127–129° C. (after recrystallization from chloroform) $[\alpha]_D^{25}$=—14.4° Infrared absorption spectrum: 1850 cm.⁻ (β-lactone).

*Elementary analysis.*—Calculated (percent): C, 49.78; H, 4.59; N, 5.81; S, 13.29. Found (percent): C, 49.79; H, 4.66; N, 6.08; S, 12.92.

EXAMPLE 2

21.4 g. of the same starting material as Example 1 was dissolved in 200 ml. of 20% of phosphoric acid. A solution of 28 g. of sodium nitrite in 300 ml. of water was gradually added to the solution in 6 hours with stirring while keeping the temperature below 5° C. The reaction mixture was treated similarly as described in Example 1, whereby 8.5 g. of the same lactone was obtained. Yield: 44%.

EXAMPLE 3

10.7 g. of the same starting material as Example 1 was dissolved in 100 ml. of 25% acetic acid. A solution of 14 g. of sodium nitrite in 200 ml. of water was gradually added to the solution in 6 hours at 0–5° C. with stirring. The reaction mixture was treated similarly to that of Example 1, whereby 5.0 g. of the same lactone was obtained. Yield: 51.9%.

EXAMPLE 4

13.4 g. of the same starting material as Example 1 was dissolved in a solution of 42 g. of citric acid in 200 ml. of water. To the resulting solution was added dropwise a solution of 10.5 g. of sodium nitrite in 100 ml. of water at about 5° C. for 5 hours with stirring. The reaction mixture was treated similarly to that of Example 1, whereby 6.65 g. of the same lactone was obtained. Yield: 55.5%.

EXAMPLE 5

10.7 g. of the starting material of Example 1 was dissolved in 80 ml. of 10% sulfuric acid. A solution of 14 g. of sodium nitrite in 200 ml. of water was added dropwise to the solution in 5 hours with stirring while keeping the temperature below 5° C. The reaction mixture was treated similarly to that of Example 1, whereby 4.0 g. of the same lactone was obtained as colorless fine needles. Yield: 41.4%. M.P. 127–129° C. (after recrystallization from chloroform).

EXAMPLE 6

17.0 g. of L-α-benzenesulfoneamido-β-amino-propionic acid was suspended on 170 ml. of 25% acetic acid. A solution of 11.2 g. of sodium nitrite in 50 ml. of water was added dropwise to the suspension in 1.5 hours at about 5° C. with stirring. The mixture was stirred for an additional 2.5 hours at the same temperature and filtered. The crystals obtained were washed with water and dissolved in an appropriate quantity of ethyl acetate. The solution was washed with water, dried with anhydrous sodium sulfate and concentrated. The precipitated crystals were collected by filtration and recrystallized from benzene, whereby 6.2 g. of L-α-benzenesulfonamido-β-propiolactone was obtained as colorless needles. M.P. 112–114° C. $[\alpha]_D^{25}$=—15.9° (c.=1, in dioxane) Infrared absorption spectrum: 1835 cm.⁻ (β-lactone).

*Elementary analysis.*—Calculated (percent): C, 47.57; H, 3.99; N, 6.16; S, 14.11. Found (percent): C, 47.90; H, 4.02; N, 6.02; S, 14.15.

EXAMPLE 7

To a solution of 2.3 g. of methyl S-benzyl-L-cysteinate in 25 ml. of ethyl acetate was added dropwise a solution of 1.6 g. of the lactone of Example 1 in 25 ml. of ethyl acetate. The mixture was stirred for about 4 hours at room temperature, and treated with diluted hydrochloric acid to remove unreacted amino acid esters. The solution was washed with an aqueous solution of sodium bicarbonate and water successively. The solution was dried and evaporated to remove the solvent, whereby 2.5 g. of methyl N-tosyl-L-seryl-S-benzyl-L-cysteinate was obtained. Yield: 80%. M.P. 96–98° C. (after recrystallization from methanol-ether) $[\alpha]_D^{20}$=+7.44° (c.=1, in dioxane).

Nitrogen content (percent): Calculated: 5.96. Found: 5.93.

EXAMPLE 8

To a solution of 1.2 g. of methyl L-phenylalaninate in 25 ml. of ethyl acetate was added dropwise a solution of 1.2 g. of the lactone of Example 1 in 25 ml. of ethyl acetate in 40 minutes at 40–50° C. with stirring. The reaction mixture was stirred for an additional 2 hours at room temperature. The reaction mixture was treated similarly to Example 7, whereby 1.6 g. of methyl N-tosyl-L-seryl-L-phenylalaninate was obtained. Yield: 76%. M.P. 131–133° C. (after recrystallization from ethyl acetate-petroleum ether) $[\alpha]_D^{20}$=+60.34° (c.=1, in dioxane).

Nitrogen content (percent): Calculated: 6.67. Found: 6.49.

EXAMPLE 9

To a solution of 1.2 g. of methyl L-phenylalaninate in 15 ml. of tetrahydrofurane was added dropwise a solution of 1.2 g. of the lactone of Example 1 in 15 ml. of tetrahydrofurane. The reaction mixture was stirred for 5 hours, and evaporated to remove the solvent. The crystals thus obtained were dissolved in 50 ml. of ethyl acetate. The solution was treated similarly to Example 7, whereby 1.6 g. of methyl N-tosyl-L-seryl-L-phenylalaninate was obtained. M.P. 131–133° C. (after recrystallization from ethyl acetate-petroleum ether).

EXAMPLE 10

To a suspended solution of 1.4 g. of ethyl glycinate hydrochloride in 25 ml. of ethyl acetate was added 1.0 g. of triethylamine at room temperature. After stirring the solution for an hour, there was added dropwise a solution of 1.6 g. of the lactone described in Example 1 in 25 ml. of ethyl acetate. The reaction mixture was stirred for about 5 hours at room temperature. The solution was treated similarly to that described in Example 7, whereby 1.95 g. of methyl N-tosyl-L-seryl-glycinate was obtained. M.P. 105–107° C. (after recrystallization from methanol-ether) $[\alpha]_D^{20}$=—12.95 (c.=1, in dioxane).

Nitrogen content (percent): Calculated: 8.14. Found (percent): 8.10.

EXAMPLE 11

To a solution of 1.3 g. of ethyl L-leucyl-L-leucinate in 25 ml. of ethyl acetate was added dropwise a solution of 1.2 g. of the lactone of Example 1 in 25 ml. of ethyl acetate at room temperature with stirring. The resulting solution was stirred for about 5 hours at room temperature. The reaction mixture was treated similarly to Example 7, whereby 1.6 g. of ethyl N-tosyl-L-seryl-L-leucyl-L-leucinate was obtained. Yield: 65%. M.P. 149–152° C.

(after recrystallization from ethyl acetate-petroleum ether) $[\alpha]_D^{20} = -48.14°$ (c.=1, in methanol). Nitrogen content (percent): Calculated: 8.17. Found (percent): 8.04.

In Examples 7–11, the lactone of Example 6 can be substituted for that of Example 1 with like effect.

What is claimed is:

1. An α-arenesulfonamido-β-propiolactone taken from the class consisting of α-(p-toluenesulfonamido)-β-propiolactone, α-benzenesulfonamido-β-propiolacetone or optically active enantiomers thereof.

References Cited

UNITED STATES PATENTS 3,028,399  4/1962  Testa _____ 260—343.9

ALEX MAZEL, Primary Examiner

A. M. T. TIGHE, Assistant Examiner

U.S. Cl. X.R.

260—112.5, 518